United States Patent
Tanaka

(10) Patent No.: US 9,548,164 B2
(45) Date of Patent: Jan. 17, 2017

(54) ORGANIC CONDUCTOR, METHOD FOR PRODUCING ORGANIC CONDUCTOR, ELECTRONIC DEVICE, AND SOLID ELECTROLYTIC CAPACITOR

(71) Applicant: Panasonic Intellectual Property Management Co., Ltd., Osaka (JP)

(72) Inventor: Yasuo Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 112 days.

(21) Appl. No.: 14/607,112

(22) Filed: Jan. 28, 2015

(65) Prior Publication Data

US 2015/0138695 A1 May 21, 2015

Related U.S. Application Data

(63) Continuation of application No. PCT/JP2013/004891, filed on Aug. 19, 2013.

(30) Foreign Application Priority Data

Aug. 23, 2012 (JP) .................................. 2012-184425

(51) Int. Cl.
*H01G 9/15* (2006.01)
*H01G 9/028* (2006.01)
*H01G 9/00* (2006.01)

(52) U.S. Cl.
CPC ............ *H01G 9/028* (2013.01); *H01G 9/0036* (2013.01); *H01G 9/15* (2013.01)

(58) Field of Classification Search
CPC ......... H01G 11/06; H01G 11/28; H01G 11/36; H01G 11/46; H01G 11/48; H01G 11/56; H01G 11/66; H01G 11/68; H01G 9/00; H01G 9/15; H01G 9/025; H01G 9/028; H01G 9/032

See application file for complete search history.

(56) References Cited

U.S. PATENT DOCUMENTS

| | | | | |
|---|---|---|---|---|
| 6,351,370 | B1 * | 2/2002 | Konuma | H01G 9/025 252/500 |
| 9,373,449 | B2 * | 6/2016 | Tanaka | H01G 9/032 |
| 2008/0106855 | A1 * | 5/2008 | Utashiro | H01G 9/012 361/541 |
| 2008/0250621 | A1 * | 10/2008 | Naito | H01G 9/0032 29/25.03 |

FOREIGN PATENT DOCUMENTS

| JP | 3-007715 | 1/1991 |
|---|---|---|
| JP | 2003-226743 | 8/2003 |
| JP | 2008-121025 | 5/2008 |

OTHER PUBLICATIONS

International Search Report of PCT application No. PCT/JP2013/004891 dated Sep. 24, 2013.

* cited by examiner

*Primary Examiner* — Dion R Ferguson
(74) *Attorney, Agent, or Firm* — McDermott Will & Emery LLP

(57) ABSTRACT

The present disclosure is to provide an organic conductor having high conductivity and heat resistance. The organic conductor in accordance with the present disclosure contains a conductive polymer, a quinone compound, and a vanadyl compound.

6 Claims, 2 Drawing Sheets

ORGANIC CONDUCTOR, METHOD FOR PRODUCING ORGANIC CONDUCTOR, ELECTRONIC DEVICE, AND SOLID ELECTROLYTIC CAPACITOR

RELATED APPLICATIONS

This application is a Continuation of International Application No. PCT/JP2013/004891, filed on Aug. 19, 2013, which in turn claims priority from Japanese Patent Application No. 2012-184425, filed on Aug. 23, 2012, the contents of all of which are incorporated herein by reference in their entireties.

TECHNICAL FIELD

The present disclosure relates to an organic conductor, a method for producing the organic conductor, an electronic device including the organic conductor, and a solid electrolytic capacitor including the organic conductor.

BACKGROUND

An organic conductor including a conductive polymer and dopant is applied to various electronic devices such as a solid electrolytic capacitor. Electrical conductivity $\sigma$ of an organic conductor is generally represented by the formula $\sigma = e \cdot n \cdot \mu$, where e denotes an elementary electric charge, n denotes a carrier density, and $\mu$ denotes mobility. Therefore, by enhancing a carrier density n and mobility $\mu$, electrical conductivity $\sigma$ of an organic conductor can be enhanced. In order to enhance the carrier density n, it is important to increase an amount of dopant in the organic conductor. In order to enhance the mobility $\mu$, it is important to enhance the orientation of the conductive polymer. Therefore, conventionally, various trials have been made for enhancing electrical conductivity $\sigma$ of an organic conductor.

For example, Japanese Patent Unexamined Publication No. 2008-121025 proposes that a conductive polymer having high conductivity be obtained by using an oxidizer and dopant for synthesizing electrically-conductive polymer including ferric methoxybenzenesulfonate or ferric ethoxybenzenesulfonate.

SUMMARY

A first disclosure of the present application is an organic conductor containing a conductive polymer, a quinone compound, and a vanadyl compound.

A second disclosure of the present application is an organic conductor containing a conductive polymer, a sulfonic acid compound, and a vanadyl compound.

In the first disclosure, the quinone compound may be a sulfonic acid compound having a quinone skeleton.

In the first disclosure, the sulfonic acid compound having a quinone skeleton may contain at least one of a compound represented by the following formula (1) and a compound represented by the following formula (2).

[Chem. 1]

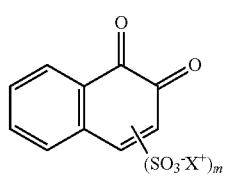

(1)

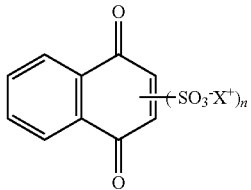

(2)

In formula (1), $X^+$ denotes a cation, and m denotes an integer of 1 to 6. In formula (2), $X^+$ denotes a cation, and n denotes an integer of 1 to 6.

A third disclosure of the present application is a method for producing an organic conductor. The method includes polymerizing a monomer to generate a conductive polymer in a presence of a quinone compound and a vanadyl compound, for obtaining an organic conductor containing a conductive polymer, a quinone compound, and a vanadyl compound.

In the third disclosure, the quinone compound may be a sulfonic acid compound having a quinone skeleton.

A fourth disclosure of the present application is an electronic device including an organic conductor in accordance with the first or second disclosure.

A fifth disclosure of the present application is a solid electrolytic capacitor including a first electrode, a dielectric layer laminated on the first electrode, a second electrode, and a solid electrolyte layer interposed between the dielectric layer and the second electrode, wherein the solid electrolyte layer includes a first electrolyte region formed of an organic conductor in accordance with the first or second disclosure.

In the fifth disclosure, the first electrolyte region is laminated on the dielectric layer, and the solid electrolyte layer may further include a second electrolyte region interposed between the first electrolyte region and the second electrode.

DESCRIPTION OF EMBODIMENTS

Figure 1:
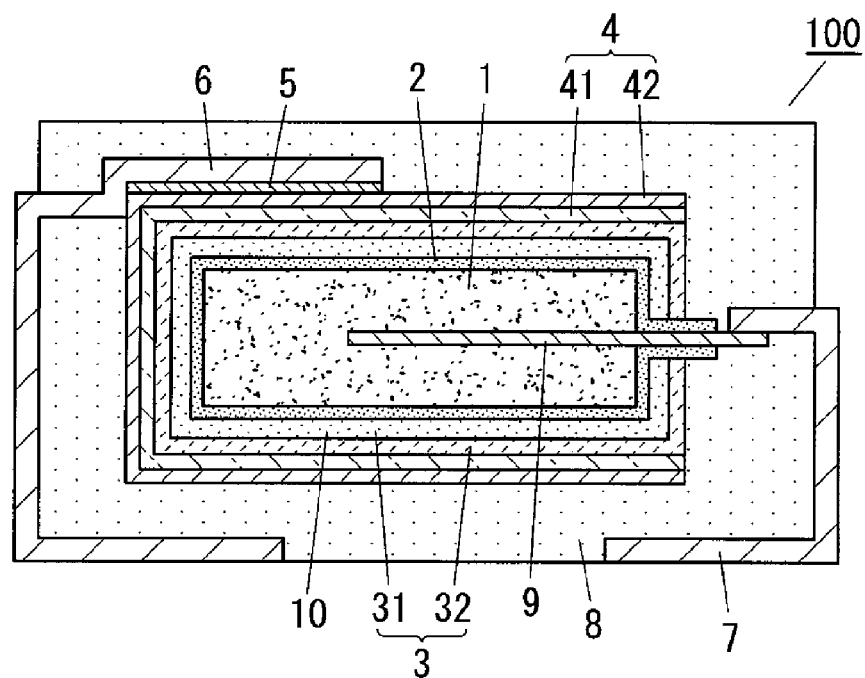
FIG. 1 is a schematic sectional view showing a structure of a solid electrolytic capacitor in accordance with one exemplary embodiment of the present disclosure.

First, problems which exemplary embodiments of this disclosure intend to solve are described.

Conventionally, it has been difficult to sufficiently improve the electrical conductivity of an organic conductor. For example, in the technique described in Japanese Patent Unexamined Publication No. 2008-121025, the orientation of a conductive polymer is not sufficiently enhanced, and accordingly the electrical conductivity of the conductive polymer is not sufficiently improved.

The present disclosure has been made in view of the above-mentioned matter, and provides an organic conductor having high conductivity and heat resistance, a method for producing the organic conductor, an electronic device including the organic conductor, and a solid electrolytic capacitor including the organic conductor.

Hereinafter, examples of preferable exemplary embodiments for carrying out the present disclosure are described.

Organic conductor 10 in accordance with one exemplary embodiment contains a conductive polymer, a sulfonic acid compound having a quinone skeleton, and a vanadyl compound. Therefore, organic conductor 10 exhibits excellent conductivity and heat resistance. This is probably because when a sulfonic acid compound and a vanadyl compound are used in combination, they exhibit excellent performance as a dopant and antioxidant for the conductive polymer. In the present disclosure, a quinone compound includes a sulfonic acid compound having a quinone skeleton.

Furthermore, when a conductive polymer is generated by a polymerization reaction in the presence of a sulfonic acid compound having a quinone skeleton and a vanadyl compound, it is considered that the sulfonic acid compound having a quinone skeleton and the vanadyl compound form a complex to thus suppress the polymerization reaction, resulting in allowing the polymerization reaction to proceed slowly. Consequently, it is considered that the orientation of the conductive polymer is enhanced and the mobility μ is improved.

In addition, it is considered that since a sulfonic acid compound having a quinone skeleton acts as dopant for a conductive polymer, a dope rate of the conductive polymer is increased, and accordingly the carrier density n is improved.

In a method for producing organic conductor 10 in accordance with this exemplary embodiment, a monomer is polymerized to generate a conductive polymer in the presence of a sulfonic acid compound having a quinone skeleton and a vanadyl compound, and thereby organic conductor 10 is obtained. In this case, the sulfonic acid compound having a quinone skeleton and the vanadyl compound act as a polymerization oxidizing agent in the polymerization of the monomer, and thus the generation of the conductive polymer is promoted. When organic conductor 10 is formed on appropriate base material in this way, adhesion between organic conductor 10 and the base material becomes extremely high. Even when the base material has a rough surface or the base material is porous, space between the base material and organic conductor 10 is not easily generated. This is probably because the reactivity of a monomer is controlled relatively mildly by the sulfonic acid compound having a quinone skeleton and the vanadyl compound. That is to say, if the reactivity of a monomer is too high, the monomer is polymerized before it enters recesses, pores, or the like, in the base material, resulting in generating space between organic conductor 10 and the base material. On the other hand, in this exemplary embodiment, space between the base material and organic conductor 10 is not easily generated probably because the reactivity of a monomer is mildly controlled, and the monomer can be polymerized after it enters recesses, pores, or the like, in the base material. In this exemplary embodiment, it is supposed that the sulfonic acid compound having a quinone skeleton and the vanadyl compound form a complex. And the complex mildly controls the reactivity of the monomer.

In a conventional conductive polymer, thermal deterioration occurs probably because the conductive polymer is oxidized by oxygen whose reactivity is increased under high temperature, the conjugated system in the conductive polymer is lost, and thereby the electrical conductivity of the conductive polymer is reduced. On the contrary, in this exemplary embodiment, it is supposed that since organic conductor 10 contains a vanadyl compound, vanadium in this vanadyl compound can have a plurality of oxidation numbers, vanadium is oxidized under high temperature to suppress the oxidation of a conductive polymer, and thus heat resistance of the organic conductor 10 is improved.

Organic conductor 10 and the production method thereof in accordance with this exemplary embodiment are described in more detail.

A monomer constituting a conductive polymer is selected from, for example, pyrrole, thiophene, aniline, acetylene, ethylene vinylidene, fluorene, vinylcarbazole, vinylphenol, benzene, pyridine, and derivatives thereof, and the like. One type of monomer or two types or more monomers may be selected. In particular, when the conductive polymer contains at least one of polypyrrole and poly(3,4-ethylenedioxothiophene), the conductivity of organic conductor 10 is particularly increased, and the heat resistance thereof is improved.

Examples of a quinone skeleton in the sulfonic acid compound having a quinone skeleton include a benzoquinone skeleton, a naphthoquinone skeleton, an anthraquinone skeleton, and the like. From the viewpoint that a strong complex can be formed together with the vanadyl compound, it is particularly preferable that the quinone skeleton is a 1,2-benzoquinone skeleton or a 1,2-naphthoquinone skeleton. The sulfonic acid compound having a quinone skeleton has a functional group selected from a sulfonic acid group and a sulfonate group. The position of the functional group is not particularly limited.

It is preferable that the sulfonic acid compound having a quinone skeleton contains at least one of a compound represented by the following formula (1) and a compound represented by the following formula (2).

[Chem. 2]

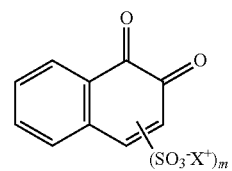

(1)

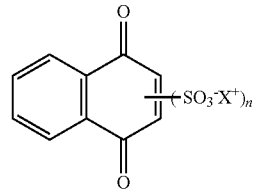

(2)

In formula (1), X$^+$ denotes a cation, and m denotes an integer of 1 to 6. In formula (2), X$^+$ denotes a cation, and n denotes an integer of 1 to 6.

In each of formulae (1) and (2), examples of the cation X$^+$ include an ion selected from, for example, a hydrogen ion and an alkali metal ion.

The vanadyl compound is selected from, for example, vanadyl sulfate, vanadyl oxalate, vanadyl acetylacetonate, vanadyl chloride, and the like. One type or two or more types of vanadyl compounds may be selected.

The rate of the sulfonic acid compound having a quinone skeleton and the vanadyl compound in organic conductor 10 is not particularly limited.

The shape of organic conductor 10 is not particularly limited, and it may be powdery or film-shaped.

For obtaining film-shaped organic conductor 10, organic conductor 10 is produced by, for example, the below-mentioned method.

Firstly, appropriate base material is prepared. A sulfonic acid compound having a quinone skeleton and a vanadyl compound are attached to the base material. In order to do so, for example, a solution containing a sulfonic acid compound having a quinone skeleton and a vanadyl compound is applied to the base material. The content of the sulfonic acid compound having a quinone skeleton and the vanadyl compound in the solution is appropriately set. In particular, it is preferable that the rate of the sulfonic acid compound having a quinone skeleton in the solution is in the range of 0.1 to 5 mass %. Furthermore, it is preferable that the rate of the vanadyl compound in the solution is in the range of 0.5 to 20 mass %. Furthermore, it is preferable that the solution further contains acid as a catalyst for allowing the vanadyl compound in the solution to act as an oxidizer. Examples of the acid include a sulfuric acid, a nitric acid, a hydrochloric acid, a methanesulfonic acid, a trifluoroacetic acid, and the like. The rate of the acid in the solution is appropriately set, and is preferably in the range of 0.1 to 5 mass %.

Subsequently, the base material is immersed in a solution containing a monomer for a conductive polymer. Thus, a chemical oxidation polymerization reaction of the monomer proceeds on the base material, and the conductive polymer is generated. Thus, film-shaped organic conductor 10, which contains the conductive polymer, the sulfonic acid compound having a quinone skeleton, and the vanadyl compound, is formed on the base material.

Furthermore, a solution containing the monomer for the conductive polymer, the sulfonic acid compound having a quinone skeleton, and the vanadyl compound may be applied to the base material. Alternatively, application of a solution containing the monomer for the conductive polymer, and then application of a solution containing the sulfonic acid compound having a quinone skeleton and the vanadyl compound may be made to the base material. Alternatively, application of a solution containing the sulfonic acid compound having a quinone skeleton and the vanadyl compound, and then application of a solution containing the monomer for the conductive polymer may be made to the base material. Also, in these cases, the chemical oxidation polymerization reaction of the monomer proceeds so as to generate the conductive polymer on the base material. Thus, film-shaped organic conductor 10 is formed on the base material.

A method for applying each of the above-mentioned solutions to the base material is not particularly limited, and examples of the method include a spin coating method, a dipping method, a drop casting method, an ink-jet method, a spray method, a screen printing method, a gravure printing method, a flexographic printing method, and the like.

A temperature of the reaction, when the chemical oxidation polymerization reaction of the monomer for the conductive polymer is allowed to proceed, is appropriately set according to the types of monomer. And the temperature is preferably, for example, in the range of 25° C. to 150° C.

When the sulfonic acid compound is attached to the base material by applying an aqueous solution containing the sulfonic acid compound to the base material, the sulfonic acid compound can be attached to the base material with high dispersibility because of high dispersibility of the sulfonic acid compound to water. Furthermore, when the vanadyl acid compound is attached to the base material by applying an aqueous solution containing the vanadyl compound to the base material, the vanadyl compound can be attached to the base material with high dispersibility because of high dispersibility of the vanadyl compound to water. It is needless to say that when an aqueous solution containing the sulfonic acid compound and the vanadyl compound is applied to the base material, the sulfonic acid compound and the vanadyl compound can be attached to the base material with high dispersibility. In these cases, the dispersibility of the sulfonic acid compound and the vanadyl compound in organic conductor 10 is improved, and therefore the conductivity of organic conductor 10 can be improved as a whole.

In this exemplary embodiment, when the chemical oxidation polymerization reaction of the monomer for the conductive polymer proceeds, as mentioned above, the sulfonic acid compound having a quinone skeleton and the vanadyl compound act as a polymerization oxidizing agent, thus promoting generation of the conductive polymer. At this time, as mentioned above, it is considered that the sulfonic acid compound having a quinone skeleton and the vanadyl compound form a complex. It is considered that when, for example, sodium 1,2-naphthoquinone-4-sulfonate is used as the sulfonic acid compound having a quinone skeleton and vanadyl oxalate is used as the vanadyl compound, at least any one of complexes represented by the following structural formulae is formed.

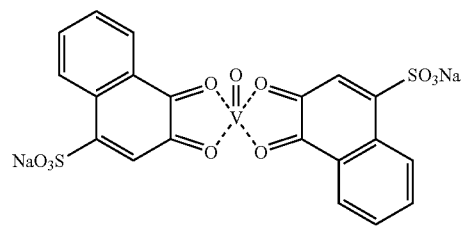

[Chem. 3]

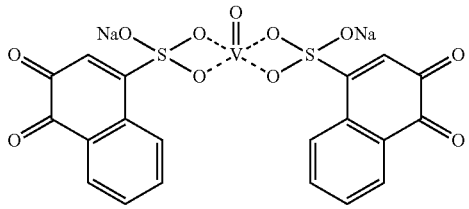

[Chem. 4]

When the polymerization reaction of a monomer proceeds on the base material, it is considered that the above-mentioned complex controls the reactivity of the monomer relatively mildly, so that space between the base material and organic conductor 10 is not easily generated, thus increasing adhesion and a contact area between the base material and organic conductor 10.

Examples of an electronic device including organic conductor 10 in accordance with this exemplary embodiment include solid electrolytic capacitor 100, an organic solar cell, a transparent conductive substrate, and the like. Since organic conductor 10 has high conductivity, use of organic conductor 10 can improve performance of electronic devices.

Solid electrolytic capacitor 100 including organic conductor 10 in accordance with this exemplary embodiment is described.

FIG. 1 is a schematic sectional view showing solid electrolytic capacitor 100 in accordance with this exemplary embodiment. Solid electrolytic capacitor 100 includes first electrode 1, dielectric layer 2, second electrode 4, and solid electrolyte layer 3. Dielectric layer 2 is formed on the first electrode 1. Solid electrolyte layer 3 is interposed between dielectric layer 2 and second electrode 4. Solid electrolyte layer 3 includes electrolyte region 31 formed of organic conductor 10 in accordance with this exemplary embodiment.

First electrode 1 functions as a positive electrode of solid electrolytic capacitor 100. In this exemplary embodiment, first electrode 1 has substantially a rectangular parallelepiped shape. First electrode 1 is made of a porous sintered body obtained by, for example, sintering powder of valve metal or an alloy thereof. Examples of the valve metal include tantalum, niobium, titanium, aluminum, hafnium, zirconium, and the like. Examples of the alloy of valve metal include an alloy of two types or more of valve metal, an alloy of valve metal and metal other than valve metal, and the like.

Dielectric layer 2 is formed of, for example, an oxide of valve metal. Dielectric layer 2 can be formed on first electrode 1, for example, by forming first electrode 1 made of a porous sintered body obtained by sintering powder of valve metal or an alloy thereof, and anodizing a surface of first electrode 1.

Second electrode 4 functions as a negative electrode of solid electrolytic capacitor 100. Second electrode 4 includes first layer 41 containing carbon particles and second layer 42 containing silver particles. First layer 41 and second layer 42 are laminated to constitute second electrode 4. Second electrode 4 is disposed to the surrounding of first electrode 1 at a distance with respect to dielectric layer 2. In second electrode 4, first layer 41 is disposed facing dielectric layer 2, and second layer 42 is disposed to an opposite side to dielectric layer 2.

Solid electrolyte layer 3 is interposed between first layer 41 of second electrode 4 and dielectric layer 2. Solid electrolyte layer 3 may be made of only electrolyte region 31 (first electrolyte region 31) formed of organic conductor 10 in accordance with this exemplary embodiment. Furthermore, solid electrolyte layer 3 may be made of electrolyte region 31 (first electrolyte region 31) formed of organic conductor 10 in accordance with this exemplary embodiment and electrolyte region 32 (second electrolyte region 32) different from first electrolyte region 31. When solid electrolyte layer 3 includes first electrolyte region 31 and second electrolyte region 32, it is preferable that first electrolyte region 31 is disposed on dielectric layer 2, and second electrolyte region 32 is disposed between first electrolyte region 31 and second electrode 4.

Second electrolyte region 32 includes, for example, an appropriate conductive polymer. A monomer constituting this conductive polymer is selected from, for example, pyrrole, thiophene, aniline, acetylene, ethylene vinylidene, fluorene, vinylcarbazole, vinylphenol, benzene, pyridine, and derivative thereof. Only one type or two more types of monomers may be selected. In particular, it is preferable that the conductive polymer contains at least one of polypyrrole and poly(3,4-ethylenedioxythiophene). Second electrolyte region 32 is formed by appropriate techniques such as chemical oxidation polymerization, electrolytic oxidation polymerization, impregnation with a disperse substance of a conductive polymer, and the like.

Furthermore, solid electrolytic capacitor 100 in accordance with this exemplary embodiment has first lead 9 electrically connected to first electrode 1 and second lead 6 electrically connected to second electrode 4. First lead 9 is electrically connected to first electrode 1 with a part thereof embedded in first electrode 1. Furthermore, terminal 7 is electrically connected to first lead 9 by, for example, welding. Furthermore, second lead 6 is electrically connected to second electrode 4 with a part thereof attached to second layer 42 of second electrode 4 via conductive adhesive agent 5.

Furthermore, solid electrolytic capacitor 100 in accordance with this exemplary embodiment has outer package 8 constituting an exterior of solid electrolytic capacitor 100. Outer package 8 covers first electrode 1, dielectric layer 2, solid electrolyte layer 3, and second electrode 4. End portions of terminal 7 and second lead 6 are drawn out of outer package 8 and exposed to the outside of solid electrolytic capacitor 100.

The thus-configured solid electrolytic capacitor 100 has first electrolyte region 31 formed of organic conductor 10 in accordance with this exemplary embodiment. Since this first electrolyte region 31 exhibits high conductivity, the equivalent series resistance (ESR) of solid electrolytic capacitor 100 is reduced. Consequently, high frequency property of solid electrolytic capacitor 100 is improved.

Furthermore, in particular, when first electrolyte region 31 is formed on dielectric layer 2, capacitance of solid electrolytic capacitor 100 is increased. The reason therefor is described.

Figure 2:
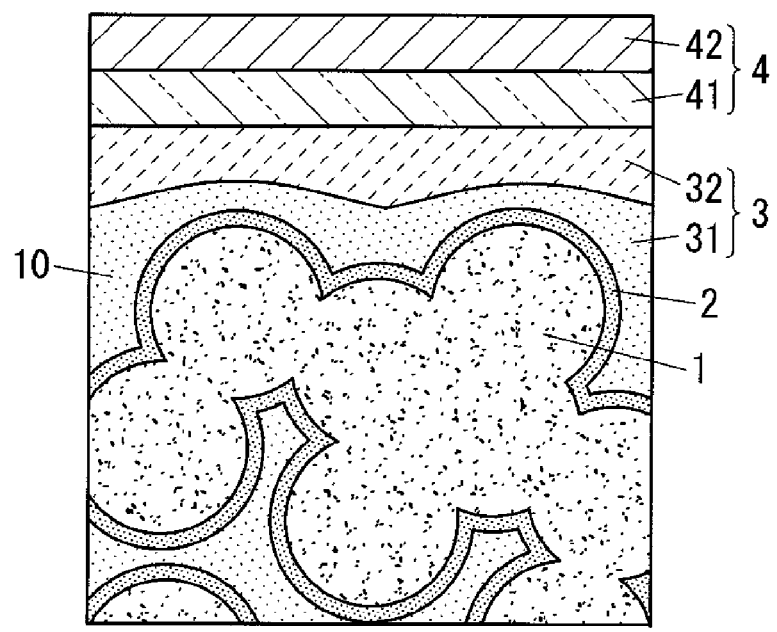
FIG. 2 is a schematic sectional view showing a microscopic structure of a part of the solid electrolytic capacitor.

FIG. 2 shows an enlarged sectional view of a part of solid electrolytic capacitor 100. As shown in FIG. 2, first electrode 1 is microscopically made of a large number of powdery substances, dielectric layer 2 is formed in a layer on the surfaces of these powdery substances. Thus, first electrode 1 and dielectric layer 2 constitute one porous body. When first electrolyte region 31 is formed on dielectric layer 2, first electrolyte region 31 enters pores of the porous body constituted by first electrode 1 and dielectric layer 2. Accordingly, a contact area between first electrolyte region 31 and dielectric layer 2 is increased, thus increasing an effective area of first electrode 1. Consequently, the capacitance of the solid electrolytic capacitor is increased.

Furthermore, in the formation of first electrolyte region 31, when dielectric layer 2 is used as the base material and organic conductor 10 in accordance with this exemplary embodiment is formed on dielectric layer 2 by chemical oxidation polymerization, capacitance of solid electrolytic capacitor 100 is further increased. As mentioned above, because the reactivity of a monomer is controlled relatively mildly by the sulfonic acid compound having a quinone skeleton and the vanadyl compound, organic conductor 10 may enter the pores of the porous body more easily so as to further increase the contact area between first electrolyte region 31 and dielectric layer 2.

Furthermore, first electrolyte region 31 has high conductivity. Therefore, when second electrolyte region 32 is laminated to be formed on first electrolyte region 31 in producing of a solid electrolytic capacitor, first electrolyte region 31 can be used as an electrolytic electrode. Thus, second electrolyte region 32 can easily formed by electrolytic oxidation polymerization.

Specific examples of a method for forming second electrolyte region 32 by electrolytic oxidation polymerization are described. Firstly, first electrolyte region 31 is formed on dielectric layer 2, and then, first electrolyte region 31 is immersed in an aqueous solution containing a monomer for forming second electrolyte region 32. Subsequently, an electric current is allowed to flow in the aqueous solution by using first electrolyte region 31 as an anode, and thereby, subjecting the monomer to electrolytic oxidation polymerization on first electrolyte region 31. Thus, second electrolyte region 32 is formed on first electrolyte region 31. In this case, since first electrolyte region 31 exhibits high conductivity, the electrolysis efficiency is improved. Consequently, second electrolyte region 32 is easily formed.

Organic solar cell 200 including organic conductor 10 in accordance with this exemplary embodiment is described.

Figure 3:
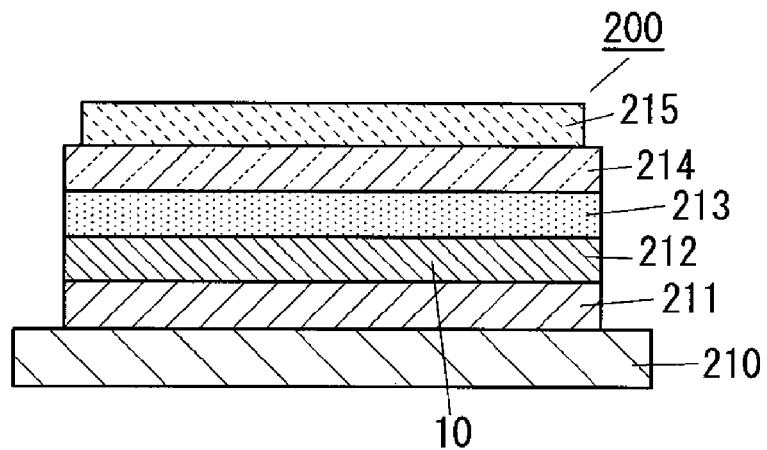
FIG. 3 is a schematic sectional view showing a structure of an organic solar cell in accordance with one exemplary embodiment of the present disclosure.

FIG. 3 is a schematic sectional view showing organic solar cell 200 in accordance with this exemplary embodiment. Organic solar cell 200 includes substrate 210, transparent electrode 211, hole transporting layer 212, active layer 213, electron transporting layer 214, and upper electrode 215. These elements are laminated in this order.

Transparent electrode 211 in organic solar cell 200 is formed of a thin film made of, for example, indium tin oxide (ITO). Hole transporting layer 212 is formed of organic conductor 10 in accordance with this exemplary embodiment. Active layer 213 is formed of, for example, a poly(3-hexyl thiophene) film. Electron transporting layer 214 is formed of, for example, a C60 fullerene film. Upper electrode 215 is formed of, for example, a metal film such as an aluminum film.

In organic solar cell 200 in accordance with this exemplary embodiment, as mentioned above, since hole transporting layer 212 is formed of organic conductor 10 in accordance with this exemplary embodiment, hole transporting layer 212 has excellent conductivity. Consequently, an IR drop caused by interface resistance and bulk resistance in organic solar cell 200 is suppressed, and thus an open circuit voltage of organic solar cell 200 is increased.

Transparent conductive substrate 300 including organic conductor 10 in accordance with this exemplary embodiment is described.

Figure 4:
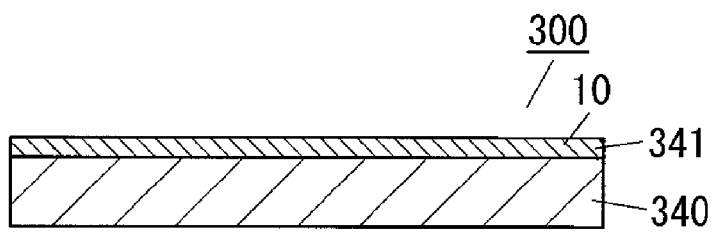
FIG. 4 is a schematic sectional view showing a structure of a transparent conductive substrate in accordance with one exemplary embodiment of the present disclosure.

FIG. 4 is a schematic sectional view showing transparent conductive substrate 300 in accordance with this exemplary embodiment. Transparent conductive substrate 300 includes substrate 340, and conductive polymer film 341 covering substrate 340.

Substrate 340 is formed of, for example, a glass substrate or a plastic substrate. Conductive polymer film 341 is formed of organic conductor 10 in accordance with this exemplary embodiment.

In transparent conductive substrate 300 in accordance with this exemplary embodiment, as mentioned above, since conductive polymer film 341 is formed of organic conductor 10 in accordance with this exemplary embodiment, conductive polymer film 341 has excellent conductivity. Accordingly, the conductivity of transparent conductive substrate 300 is improved. Furthermore, conductive polymer film 341 can be thinned with the high conductivity of conductive polymer film 341 maintained, thus improving optical transparency of transparent conductive substrate 300.

Transparent conductive substrate 300 can be applied to, for example, a touch panel or a display. As display application, for example, transparent conductive substrate 300 can be applied to electrodes for organic electroluminescence, liquid crystal, or electronic paper.

Figure 5:
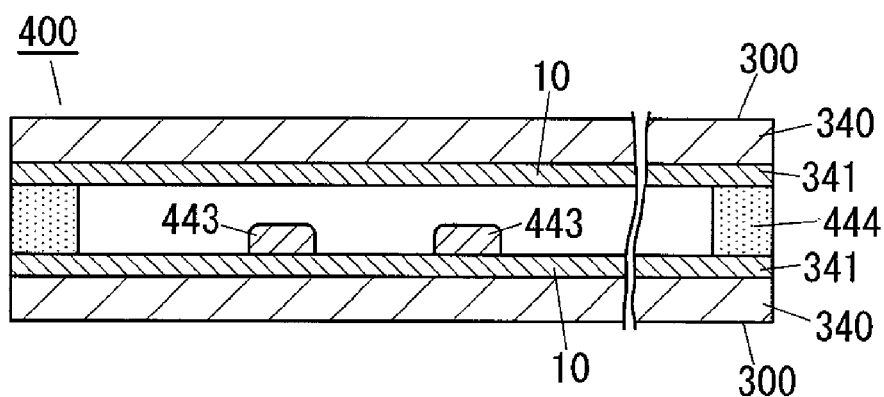
FIG. 5 is a schematic sectional view showing a structure of a resistance film-type touch panel including the transparent conductive substrate.

FIG. 5 is a schematic sectional view showing resistance film-type touch panel 400 including transparent conductive substrate 300 in accordance with this exemplary embodiment. This touch panel 400 includes two transparent conductive substrates 300. These transparent conductive substrates 300 are disposed such that two conductive polymer films 341 face each other at an interval. Two conductive polymer films 341 are bonded to each other with bonding agent 444. Furthermore, between two conductive polymer films 341, insulating dot spacers 443 are disposed on the entire surface of conductive polymer film 341 uniformly at a constant interval. This configuration prevents conductive polymer films 341 from being brought into contact with each other due to bending of film substrates 340.

When one of film substrates 340 in this touch panel 400 is pressed with a pen, a finger, or the like, the pressing force thereof brings two conductive polymer films 341 into contact with each other and into electrical conduction between dot spacers 443. In this state, by detecting a resistance value of conductive polymer film 341 from an end of touch panel 400 to a position at which conductive polymer films 341 are brought into contact with each other, it is possible to detect a position at which conductive polymer films 341 are brought into contact with each other.

EXAMPLES

Example 1

An organic conductor in accordance with the present disclosure is produced as described below.

An aqueous solution containing 5 mass % vanadyl oxalate, 1 mass % sodium 1,2-naphthoquinone-4-sulfonate, and 1 mass % sulfuric acid is prepared. While the aqueous solution is vigorously stirred at room temperature, 3,4-ethylenedioxythiophene in an amount equal to the amount of vanadyl oxalate is slowly dripped to the aqueous solution. Subsequently, this aqueous solution is continued to be stirred at a temperature of 25° C. for 24 hours to allow a polymerization reaction to proceed in the aqueous solution. Thus, precipitate is generated in the aqueous solution. Subsequently, the aqueous solution is filtered, then the precipitate is washed with pure water and ethanol, and further, the precipitate is dried at 100° C. for 30 minutes. Thus, powder of the organic conductor is obtained. This powder is pressure-molded to produce a cylindrical pellet having a diameter of 1 cm and a thickness of 1 mm.

Immediately after the pellet of the organic conductor is produced, the electrical conductivity of the pellet is measured by using a resistivity meter (product number: Resta MC Para T610, manufactured by Dia Instruments. Co., Ltd.). The measurement result is 200 S/cm. Furthermore, this pellet is exposed to a temperature of 125° C. in a thermostat for 24 hours. After that, the electrical conductivity of this pellet is measured by the same method as mentioned above. The measurement result is 150 S/cm.

Example 2

A pellet of an organic conductor is produced in the same conditions as in Example 1 except that vanadyl sulfate is used instead of vanadyl oxalate in Example 1.

The electrical conductivity of the pellet of the organic conductor is measured by the same method as in Example 1, immediately after the pellet is produced and after the pellet is exposed to a temperature of 125° C. for 24 hours. The measurement results are 190 S/cm and 145 S/cm, respectively.

Comparative Example 1

A pellet of an organic conductor is produced in the same conditions as in Example 1 except that sodium 1,2-naphthoquinone-4-sulfonate is not used in Example 1.

The electrical conductivity of the pellet of the organic conductor is measured by the same method as in Example 1, immediately after the pellet is produced and after the pellet is exposed to a temperature of 125° C. for 24 hours. The measurement results are 25 S/cm and 15 S/cm, respectively.

Comparative Example 2

A pellet of an organic conductor is produced in the same conditions as in Example 1 except that vanadyl oxalate is not used in Example 1.

The electrical conductivity of the pellet of the organic conductor is measured by the same method as in Example 1, immediately after the pellet is produced and after the pellet is exposed to a temperature of 125° C. for 24 hours. The measurement results are 50 S/cm and 25 S/cm, respectively.

Comparative Example 3

A pellet of an organic conductor is produced in the same conditions as in Example 1 except that vanadyl sulfate is used instead of vanadyl oxalate and sodium 1,2-naphthoquinone-4-sulfonate is not used in Example 1.

The electrical conductivity of the pellet of the organic conductor is measured by the same method as in Example 1, immediately after the pellet is produced and after the pellet is exposed to a temperature of 125° C. for 24 hours. The measurement results are 20 S/cm and 12 S/cm, respectively.

The above-mentioned results are shown in the following Table 1.

TABLE 1

| | Raw material of organic conductor | | | Electrical conductivity (S/cm) | |
|---|---|---|---|---|---|
| | | | | Immediately after production | After exposure to 125° C. for 24 h |
| Ex. 1 | vanadyl oxalate | sodium 1,2-naphthoquinone-4-sulfonate | 3,4-ethylenedioxythiophene | 200 | 150 |
| Ex. 2 | vanadyl sulfate | sodium 1,2-naphthoquinone-4-sulfonate | 3,4-ethylenedioxythiophene | 190 | 145 |
| Co. Ex. 1 | vanadyl oxalate | — | 3,4-ethylenedioxythiophene | 25 | 15 |
| Co. Ex. 2 | — | sodium 1,2-naphthoquinone-4-sulfonate | 3,4-ethylenedioxythiophene | 50 | 25 |
| Co. Ex. 3 | vanadyl sulfate | — | 3,4-ethylenedioxythiophene | 20 | 12 |

Ex. = Example
Co. Ex. = Comparative Example

As mentioned above, since the organic conductors of Examples 1 and 2 are formed of an organic conductor containing a conductive polymer, a sulfonic acid compound having a quinone skeleton, and a vanadyl compound, they have higher electrical conductivity with Comparative Examples 1 to 3. And the electrical conductivity of them is less easily lowered by heating as compared with Comparative Examples 1 to 3.

Example 3

A solid electrolytic capacitor having the structure shown in FIG. 1 is produced as follows.

A first electrode (positive electrode) having a rectangular parallelepiped shape having a dimension of 4.5 mm×3.3 mm×1.0 mm is formed of a sintered body of tantalum powder. A part of a first lead is embedded into one side surface (a side surface having a dimension of 3.3 mm×1.0 mm) of the first electrode. The surface of the first electrode is anodized in a phosphoric acid solution to form a dielectric layer.

Subsequently, the first electrode with the dielectric layer is immersed in an aqueous solution containing 5 mass % vanadyl oxalate, 1 mass % sodium 1,2-naphthoquinone-4-sulfonate, and 1 mass % sulfuric acid. And then the first electrode with the dielectric layer is lifted from the aqueous solution so as to attach the aqueous solution to the dielectric layer. Subsequently, the first electrode with the dielectric layer is dried in the air.

Subsequently, the first electrode with the dielectric layer is immersed in liquid 3,4-ethylenedioxythiophene and then lifted therefrom so as to attach 3,4-ethylenedioxythiophene to the dielectric layer. Subsequently, the first electrode with the dielectric layer is disposed in a 50° C.-thermostat for 30 minutes. And a polymerization reaction of 3,4-ethylenedioxythiophene is allowed to proceed on the dielectric layer. Thus, a first electrolyte region including an organic conductor containing poly(3,4-ethylenedioxythiophene), vanadyl oxalate, and sodium 1,2-naphthoquinone-4-sulfonate is formed on the dielectric layer.

Then, the first electrode with the first electrolyte region is immersed in an aqueous solution containing pyrrole and sodium alkylnaphthalenesulfonate. In this state, an electric current is allowed to flow in the aqueous solution by using the first electrolyte region as an anode. Thus, a second electrolyte region including polypyrrole is formed on the first electrolyte region. Thus, a solid electrolyte layer including the first electrolyte region and the second electrolyte region is formed.

Next, carbon paste is applied to the solid electrolyte layer, and then dried so as to form a first layer containing carbon particles on the solid electrolyte layer. Subsequently, silver paste is applied to the first layer, and then dried so as to form a second layer containing silver particles on the first layer. Thus, a second electrode (negative electrode) including the first layer and the second layer is formed.

Next, the first lead is connected to a terminal by welding, and a second lead is adhesively bonded to the negative electrode with a conductive adhesive agent. Subsequently, an outer package is formed by transfer molding using epoxy resin. Then, the outer package covers the first electrode, the dielectric layer, the solid electrolyte layer, and the second electrode. An end portion of the second lead and the terminal are drawn out from the outer package to be exposed to the outside. Thus, a solid electrolytic capacitor is obtained.

The capacitance of the solid electrolytic capacitor is measured by using an LCR meter at a frequency of 120 Hz. The measurement result is 530.8 μF. Furthermore, the equivalent series resistance (ESR) of the solid electrolytic capacitor is measured by using an LCR meter at a frequency of 100 kHz. The measurement result is 6.2 mΩ.

Example 4

A solid electrolytic capacitor is produced in the same conditions as in Example 3 except that vanadyl sulfate is used instead of vanadyl oxalate in the formation of the first electrolyte region in Example 3.

The capacitance and the equivalent series resistance (ESR) of this solid electrolytic capacitor are measured by the same method as in Example 3. The measurement results are 534.4 μF and 5.9 mΩ, respectively.

Comparative Example 4

A solid electrolytic capacitor is produced in the same conditions as in Example 3 except that sodium 1,2-naphthoquinone-4-sulfonate is not used in the formation of the first electrolyte region in Example 3.

The capacitance and the equivalent series resistance (ESR) of this solid electrolytic capacitor are measured by the same method as in Example 3. The measurement results are 420.6 μF and 9.8 mΩ, respectively.

Comparative Example 5

A solid electrolytic capacitor is produced in the same conditions as in Example 3 except that vanadyl oxalate is not used in the formation of the first electrolyte region in Example 3.

The capacitance and the equivalent series resistance (ESR) of this solid electrolytic capacitor are measured by the same method as in Example 3. The measurement results are 306.0 μF and 12.1 mΩ, respectively.

Comparative Example 6

A solid electrolytic capacitor is produced in the same conditions as in Example 3 except that vanadyl sulfate is used instead of vanadyl oxalate and sodium 1,2-naphthoquinone-4-sulfonate is not used in the formation of the first electrolyte region in Example 3.

The capacitance and the equivalent series resistance (ESR) of this solid electrolytic capacitor are measured by the same method as in Example 3. The measurement results are 434.3 μF and 8.9 mΩ, respectively.

The above-mentioned results are shown in Table 2.

TABLE 2

| | Raw material of first electrolyte region | | | Capacitance (μF) | ESR (mΩ) |
|---|---|---|---|---|---|
| Ex. 3 | vanadyl oxalate | sodium 1,2-naphthoquinone-4-sulfonate | 3,4-ethylenedioxythiophene | 530.8 | 6.2 |
| Ex. 4 | vanadyl sulfate | sodium 1,2-naphthoquinone-4-sulfonate | 3,4-ethylenedioxythiophene | 534.4 | 5.9 |
| Co. Ex. 4 | vanadyl oxalate | — | 3,4-ethylenedioxythiophene | 420.6 | 9.8 |
| Co. Ex. 5 | — | sodium 1,2-naphthoquinone-4-sulfonate | 3,4-ethylenedioxythiophene | 306.0 | 12.1 |
| Co. Ex. 6 | vanadyl sulfate | — | 3,4-ethylenedioxythiophene | 434.3 | 8.9 |

Ex. = Example
Co. Ex. = Comparative Example

As mentioned above, in Examples 3 and 4, the first electrolyte region is formed of an organic conductor containing a conductive polymer, a sulfonic acid compound having a quinone skeleton, and a vanadyl compound. As a result, a solid electrolytic capacitor having high capacitance and low equivalent series resistance is obtained.

What is claimed is:

1. An organic conductor containing a conductive polymer, a sulfonic acid compound having a quinone skeleton, and a vanadyl compound.

2. The organic conductor according to claim 1, wherein the sulfonic acid compound having the quinone skeleton contains at least one of a compound represented by a following formula (1) and a compound represented by a following formula (2):

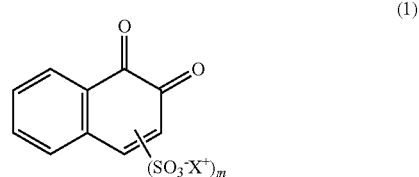

(1)

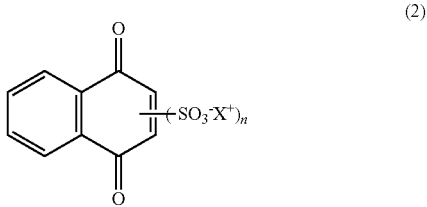

(2)

wherein, in the formula (1), X⁺denotes a cation and m denotes an integer of 1 to 6; and in the formula (2), X⁺denotes a cation and n denotes an integer of 1 to 6.

3. A method for producing an organic conductor, the method comprising:
polymerizing a monomer to generate a conductive polymer in a presence of a sulfonic acid compound having a quinone skeleton and a vanadyl compound, for obtaining an organic conductor containing a conductive polymer, a sulfonic acid compound having a quinone skeleton, and a vanadyl compound.

4. An electronic device comprising the organic conductor according to claim 1.

5. A solid electrolytic capacitor comprising:
a first electrode;
a dielectric layer laminated on the first electrode;
a second electrode; and
a solid electrolyte layer interposed between the dielectric layer and the second electrode,
wherein the solid electrolyte layer comprises a first electrolyte region formed of the organic conductor according to claim 1.

6. The solid electrolytic capacitor of according to claim 5, wherein the first electrolyte region is laminated on the dielectric layer, and the solid electrolyte layer further comprises a second electrolyte region interposed between the first electrolyte region and the second electrode.

* * * * *